(12) United States Patent
Frank

(10) Patent No.: US 11,143,287 B2
(45) Date of Patent: Oct. 12, 2021

(54) HYDRAULIC CONTROL VALVE

(71) Applicant: GM Global Technology Operations LLC, Detroit, MI (US)

(72) Inventor: Dale A. Frank, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 16/371,864

(22) Filed: Apr. 1, 2019

(65) Prior Publication Data
US 2020/0309247 A1    Oct. 1, 2020

(51) Int. Cl.
*F16K 31/36* (2006.01)
*F16H 57/04* (2010.01)
*F16K 31/122* (2006.01)
*F16K 3/314* (2006.01)

(52) U.S. Cl.
CPC ......... *F16H 57/0435* (2013.01); *F16K 3/314* (2013.01); *F16K 31/1221* (2013.01); *F16K 31/36* (2013.01); *F16H 57/0436* (2013.01)

(58) Field of Classification Search
CPC ............. F16H 57/0435; F16H 57/0436; F16H 2061/0279; F16K 31/1221; F16K 31/1225; F16K 31/36; F16K 3/314; F16K 31/0679; F16K 11/202; F16K 11/07; F16K 27/041; H01F 2007/1692; F15B 13/0403; F15B 13/021; G05D 16/2033; Y10T 137/87925; Y10T 137/88022; Y10T 137/8803; Y10T 137/88038; Y10T 137/86493–86887; Y10T 137/87169–87241

USPC ......... 137/614, 614.16–614.18, 625–625.49, 137/596–596.2, 884; 335/92, 119, 149, 335/177–184, 207, 259, 266, 267, 268, 335/306; 251/129.09, 129.1
See application file for complete search history.

(56) References Cited

U.S. PATENT DOCUMENTS

| | | | | |
|---|---|---|---|---|
| 1,882,392 A | * | 10/1932 | Musgrave | F16K 31/0679 137/630 |
| 3,537,355 A | * | 11/1970 | Bliss | F15B 21/08 91/51 |
| 4,505,300 A | * | 3/1985 | Jaeger | F16K 31/0686 137/614.14 |
| 4,624,282 A | * | 11/1986 | Fargo | F16K 31/0679 137/599.07 |
| 4,860,792 A | * | 8/1989 | Ichihashi | F15B 13/0402 137/596.17 |
| 5,174,189 A | * | 12/1992 | Kamimura | F15B 13/01 91/446 |
| 5,199,459 A | * | 4/1993 | Mullally | F02K 9/58 137/613 |
| 6,047,718 A | * | 4/2000 | Konsky | F16K 1/443 137/1 |

(Continued)

*Primary Examiner* — Craig J Price

(57) ABSTRACT

A hydraulic control valve for controlling hydraulic circuits comprises a valve housing defining a valve bore, a first spool valve slidably positioned within the valve bore and adapted to control a first hydraulic circuit, and a second spool valve slidably positioned within the valve bore and adapted to control a second hydraulic circuit. The first spool valve and the second spool valve are positioned co-axially within the valve bore and are independently slidable within the valve bore to allow the first and second spool valves to control the first and second hydraulic valves independently of one another.

19 Claims, 4 Drawing Sheets

(56) References Cited

U.S. PATENT DOCUMENTS

| | | | | |
|---|---|---|---|---|
| 6,431,046 B1* | 8/2002 | Okpokowuruk | ........ | F01L 25/02 |
| | | | | 137/625.63 |
| 7,909,060 B2* | 3/2011 | Yamamoto | ......... | G05D 16/2026 |
| | | | | 137/625.6 |
| 2013/0087729 A1* | 4/2013 | Bento | ................. | F16K 31/0613 |
| | | | | 251/282 |

* cited by examiner

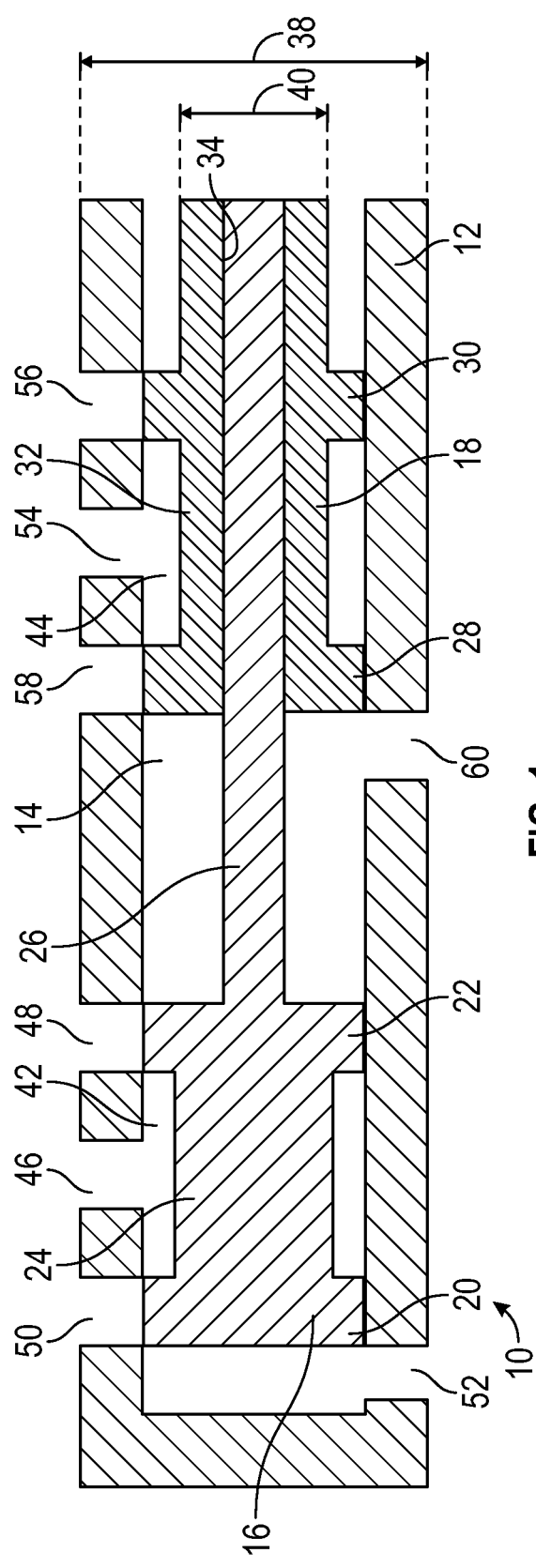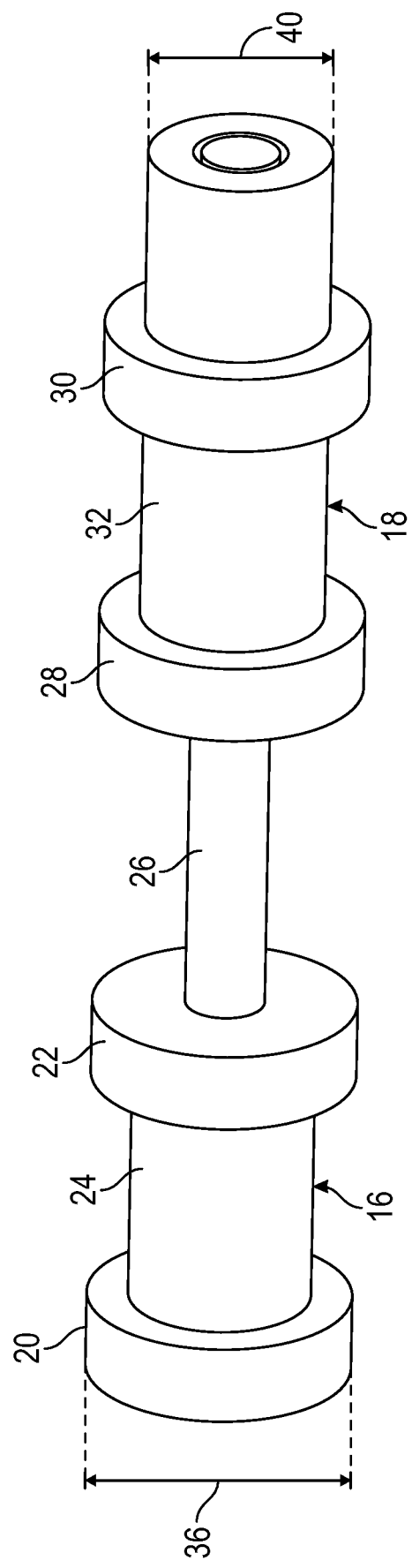

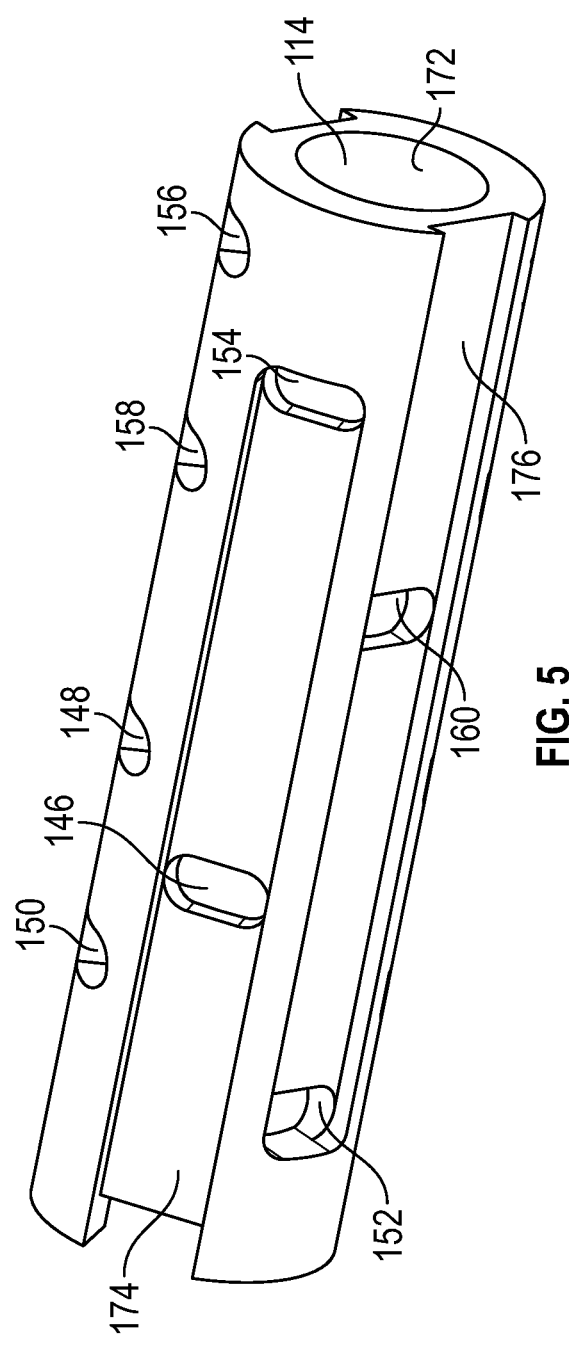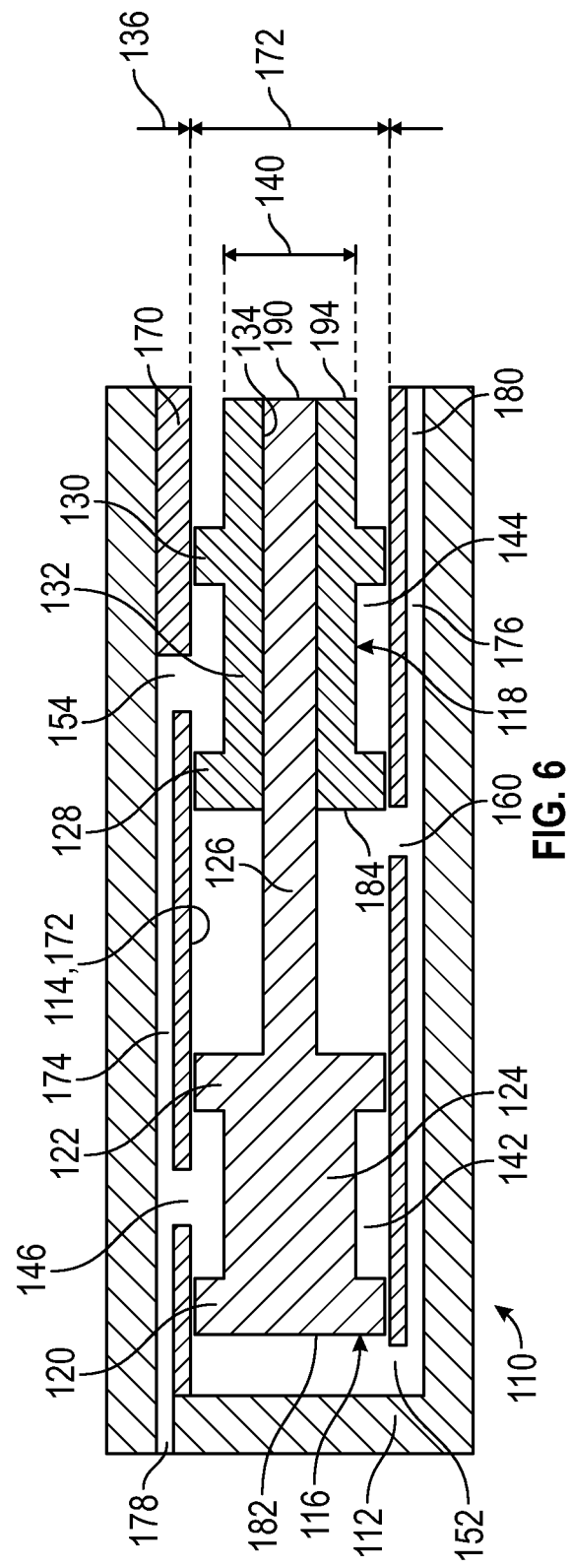

HYDRAULIC CONTROL VALVE

INTRODUCTION

The present disclosure relates to a control valve for a hydraulic circuit. Different control system types have been developed for multiple speed automatic transmissions for motor vehicles. One type utilizes pressurized hydraulic fluid (transmission oil) provided to a control valve body having a plurality of multi-port spool valves which direct such fluid to a plurality of hydraulically actuated devices, such as clutches and brakes associated with various elements of a plurality of planetary gear assemblies. Such a transmission may be essentially self-contained as most upshift and downshift decisions are made by the valves in the control valve body.

Another type of control system utilizes solenoid valves and multiple port spool or logic valves to direct pressurized hydraulic (transmission) fluid to a plurality of actuators associated with synchronizer clutches and one or two drive gears. Activation of a solenoid valve when the spool or logic valves are appropriately positioned, provides hydraulic fluid which translates an actuator and engages a desired gear and speed ratio. In addition, such hydraulic systems are used in heavy equipment for agricultural and construction applications. These type of control systems use hydraulic actuators to move loads or position element of the equipment or attachments thereto. Automated industrial and manufacturing equipment use hydraulic control systems to control hydraulic actuators for tool holding, work holding/clamping, and positioning cutting tools, etc.

These hydraulic control systems are of critical importance, particularly as related to automotive technology. Automobile development continually strives to provide more efficient control of automatic transmissions. Thus, while current hydraulic controls technology achieves the intended purpose, there is a need for an improved hydraulic control valve that provides efficient control of multiple hydraulic circuits in an efficient and compact manner.

SUMMARY

According to several aspects of the present disclosure, a hydraulic control valve comprises a valve housing defining a valve bore, a first spool valve slidably positioned within the valve bore and adapted to control a first hydraulic circuit, and a second spool valve slidably positioned within the valve bore and adapted to control a second hydraulic circuit. The first spool valve and the second spool valve are positioned co-axially within the valve bore and are independently slidable within the valve bore to allow the first and second spool valves to control the first and second hydraulic valves independently of one another.

According to another aspect of the present disclosure, the first spool valve includes a first land, a second land, a central shaft extending between the first and second lands, and a pin shaft extending longitudinally within the valve bore. The second spool valve includes a first land, a second land, a central shaft extending between the first and second lands, and a cylindrical bore formed therein. The pin shaft of the first spool valve extends through the cylindrical bore of the second spool valve.

According to another aspect of the present disclosure, each of the first and second lands of the first and second spool valves have an outer diameter and the valve bore has an inner diameter. There is a clearance fit between the inner diameter of the valve bore and the outer diameter of each of the first and second lands of the first and second spool valves, allowing movement of the first and second spool valves within the valve bore and substantially stopping hydraulic fluid from flowing between the inner diameter of the valve bore and the outer diameter of each of the first and second lands of the first and second spool valves.

According to another aspect of the present disclosure, the central shafts extending between the first and second lands on each of the first and second spool valves has an outer diameter. A first flow chamber is defined by the first and second lands and the central shaft of the first spool valve and the inner diameter of the valve bore. A second flow chamber is defined by the first and second lands and the central shaft of the second spool valve and the inner diameter of the valve bore.

According to another aspect of the present disclosure, the first hydraulic circuit includes a first supply port, a first feed port, a first return port and a first exhaust port. The first supply port is adapted to allow hydraulic fluid to be fed into the valve bore. The first feed port is adapted to allow hydraulic fluid to be fed from the valve bore to a first hydraulically actuated device. The first return port is adapted to allow hydraulic fluid to return to the valve bore from the first hydraulically actuated device. The first exhaust port is adapted to exhaust hydraulic fluid from the valve bore. The second hydraulic circuit includes a second supply port, a second feed port, a second return port and a second exhaust port. The second supply port is adapted to allow hydraulic fluid to be fed into the valve bore. The second feed port is adapted to allow hydraulic fluid to be fed from the valve bore to a second hydraulically actuated device. The second return port is adapted to allow hydraulic fluid to return to the valve bore from the second hydraulically actuated device. The second exhaust port is adapted to exhaust hydraulic fluid from the valve bore.

According to another aspect of the present disclosure, the first supply port and the second supply port are connected to a common pressurized hydraulic fluid source.

According to another aspect of the present disclosure, the first spool valve is slidable within the valve bore between a closed position and an open position. When the first spool valve is in the closed position, the first feed port and the first return port are blocked by the first spool valve. When the first spool valve is in the open position, the first supply port, the first feed port, the first return port and the first exhaust port are all open and hydraulic fluid is able to flow into the valve bore through the first supply port, to the first hydraulically actuated device through the first feed port, back to the valve bore from the first hydraulically actuated device through the first return port and out of the valve bore through the first exhaust port.

According to another aspect of the present disclosure, the second spool valve is slidable within the valve bore between a closed position and an open position. When the second spool valve is in the closed position, the second feed port and the second return port are blocked by the second spool valve. When the second spool valve is in the open position, the second supply port, the second feed port, the second return port and the second exhaust port are all open and hydraulic fluid is able to flow into the valve bore through the second supply port, to the second hydraulically actuated device through the second feed port, back to the valve bore from the second hydraulically actuated device through the second return port and out of the valve bore through the second exhaust port.

According to another aspect of the present disclosure, when the first spool valve is in the closed position, the first land of the first spool valve is aligned with and blocks the first feed port and the second land of the first spool valve is aligned with and blocks the first return port, and hydraulic fluid entering the valve bore through the first supply port is stopped within the first flow chamber. When the second spool valve is in the closed position, the first land of the second spool valve is aligned with and blocks the second feed port and the second land of the second spool valve is aligned with and blocks the second return port, and hydraulic fluid entering the valve bore through the second supply port is stopped within the second flow chamber.

According to another aspect of the present disclosure, the hydraulic control valve further comprises a sleeve positioned within the valve housing. An inner diameter of the sleeve defines the valve bore and includes a supply channel formed therein interconnecting the first and second supply ports, and an exhaust channel formed therein interconnecting the first and second exhaust ports.

According to another aspect of the present disclosure, the first spool valve includes a first land, a second land, a central shaft extending between the first and second lands, and a pin shaft extending longitudinally within the valve bore, and the second spool valve includes a first land, a second land, a central shaft extending between the first and second lands, and a cylindrical bore formed therein, further wherein, the pin shaft of the first spool valve extends through the cylindrical bore of the second spool valve.

According to another aspect of the present disclosure, each of the first and second lands of the first and second spool valves have an outer diameter and the valve bore has an inner diameter, wherein there is a clearance fit between the inner diameter of the valve bore and the outer diameter of each of the first and second lands of the first and second spool valves, allowing movement of the first and second spool valves within the valve bore and substantially stopping hydraulic fluid from flowing between the inner diameter of the valve bore and the outer diameter of each of the first and second lands of the first and second spool valves.

According to another aspect of the present disclosure, the central shafts extending between the first and second lands on each of the first and second spool valves has an outer diameter, wherein a first flow chamber is defined by the first and second lands and the central shaft of the first spool valve and the inner diameter of the valve bore, and a second flow chamber is defined by the first and second lands and the central shaft of the second spool valve and the inner diameter of the valve bore.

According to another aspect of the present disclosure, the first hydraulic circuit includes a first supply port, a first feed port, a first return port and a first exhaust port, the first supply port adapted to allow hydraulic fluid to be fed through the valve housing and the sleeve into the valve bore, the first feed port adapted to allow hydraulic fluid to be fed from the valve bore through the sleeve and the valve housing to a first hydraulically actuated device, the first return port adapted to allow hydraulic fluid to return to the valve bore through the valve housing and the sleeve from the first hydraulically actuated device, and the first exhaust port adapted to exhaust hydraulic fluid from the valve bore to the exhaust channel formed within the sleeve, and the second hydraulic circuit includes a second supply port, a second feed port, a second return port and a second exhaust port, the second supply port adapted to allow hydraulic fluid to be fed through the valve housing and the sleeve into the valve bore, the second feed port adapted to allow hydraulic fluid to be fed from the valve bore through the sleeve and the valve housing to a second hydraulically actuated device, the second return port adapted to allow hydraulic fluid to return to the valve bore through the valve housing and the sleeve from the second hydraulically actuated device, and the second exhaust port adapted to exhaust hydraulic fluid from the valve bore to the exhaust channel formed within the sleeve.

According to another aspect of the present disclosure, the first spool valve is slidable within the valve bore between a closed position and an open position, wherein when the first spool valve is in the closed position, the first feed port and the first return port are blocked by the first spool valve and when the first spool valve is in the open position, the first supply port, the first feed port, the first return port and the first exhaust port are all open and hydraulic fluid is able to flow into the valve bore through the first supply port, to the first hydraulically actuated device through the first feed port, back to the valve bore from the first hydraulically actuated device through the first return port and out of the valve bore through the first exhaust port.

According to another aspect of the present disclosure, the second spool valve is slidable within the valve bore between a closed position and an open position, wherein when the second spool valve is in the closed position, the second feed port and the second return port are blocked by the second spool valve and when the second spool valve is in the open position, the second supply port, the second feed port, the second return port and the second exhaust port are all open and hydraulic fluid is able to flow into the valve bore through the second supply port, to the second hydraulically actuated device through the second feed port, back to the valve bore from the second hydraulically actuated device through the second return port and out of the valve bore through the second exhaust port.

According to another aspect of the present disclosure, when the first spool valve is in the closed position, the first land of the first spool valve is aligned with and blocks the first feed port formed in the valve housing and the sleeve and the second land of the first spool valve is aligned with and blocks the first return port formed in the valve housing and the sleeve, and hydraulic fluid entering the valve bore through the first supply port is stopped within the first flow chamber, and when the second spool valve is in the closed position, the first land of the second spool valve is aligned with and blocks the second feed port and the second land of the second spool valve is aligned with and blocks the second return port, and hydraulic fluid entering the valve bore through the second supply port is stopped within the second flow chamber.

According to another aspect of the present disclosure, the hydraulic control valve further comprises an actuator mounted near an end of the valve housing, wherein the actuator is adapted to selectively and independently move the first and second spool valves within the valve bore.

According to another aspect of the present disclosure, the valve housing and the first and second spool valves are made from a common material.

According to another aspect of the present disclosure, the valve housing, the first and second spool valves and the sleeve are made from a common material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic sectional view of a hydraulic control valve according to an exemplary embodiment;

FIG. 2 is a perspective view of the first and second spool valves of the hydraulic control valve shown in FIG. 1;

FIG. 5 is a perspective view of a sleeve of the hydraulic control valve shown in FIG. 4;

FIG. 6 is a schematic sectional view of the hydraulic control valve shown in FIG. 4, illustrating the supply channel and the exhaust channel of the sleeve shown in FIG. 5;

DETAILED DESCRIPTION

The following description is merely exemplary in nature and is not intended to limit the present disclosure, application, or uses.

Figure 3:
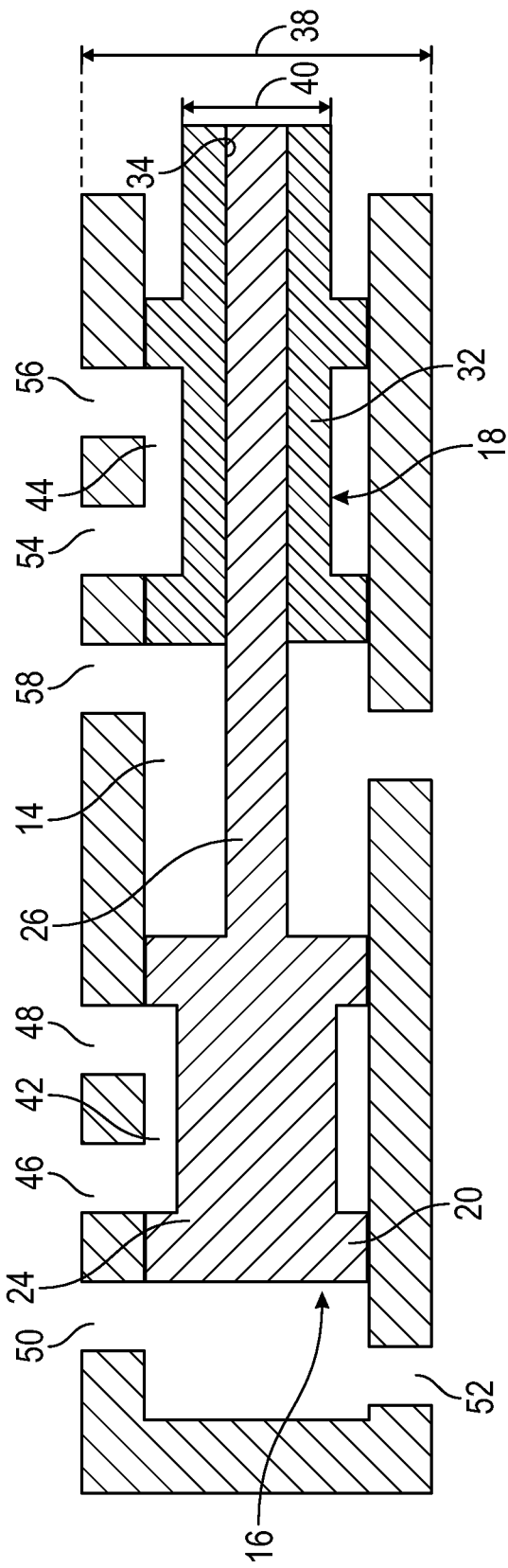
FIG. 3 is a schematic sectional view of the hydraulic control valve shown in FIG. 1, wherein the first and second spool valves are in the open position.
Figure 4:
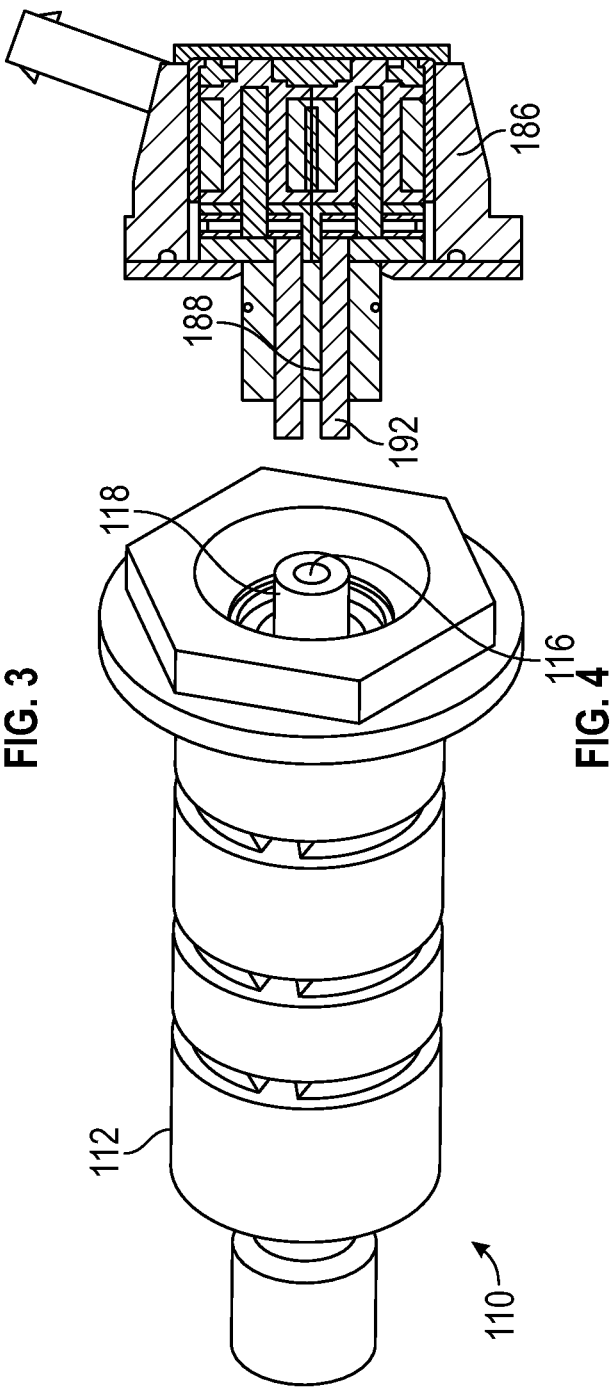
FIG. 4 is a perspective view of a hydraulic control valve according to an exemplary embodiment.

Referring to FIGS. 1, 2 and 3, a hydraulic control valve 10 of the present disclosure comprises a valve housing 12 defining a valve bore 14, a first spool valve 16 slidably positioned within the valve bore 14 and a second spool valve 18 slidably positioned within the valve bore 14. The first and second spool valves 16, 18 are aligned co-axially within the valve bore 14 and are independently slidable within the valve bore 14. The first spool valve 16 is adapted to control a first hydraulic circuit 19 and the second spool valve 18 is adapted to control a second hydraulic circuit 21. Movement of the first and second spool valves 16, 18 independently of one another allows the first and second hydraulic circuits 19, 21 to be controlled independently of one another.

The first spool valve 16 includes a first land 20, a second land 22, a central shaft 24 extending between the first and second lands 20, 22, and a pin shaft 26 extending longitudinally within the valve bore 14. The second spool valve 18 includes a first land 28, a second land 30, a central shaft 32 extending between the first and second lands 28, 30, and a cylindrical bore 34 formed therein. The pin shaft 26 of the first spool valve 16 extends through the cylindrical bore 34 of the second spool valve 18. There is a clearance fit between the pin shaft 26 of the first spool valve 16 and the cylindrical bore 34 of the second spool valve 18. The first and second spool valves 16, 18 are slidably moveable relative to one another within the valve bore 14.

Each of the first and second lands 20, 22, 28, 30 of the first and second spool valves 16, 18 has an outer diameter 36 and the valve bore 14 has an inner diameter 38. The outer diameter 36 of the first and second lands 20, 22, 28, 30 on the first and second spool valves 16, 18 is smaller than the inner diameter 38 of the valve bore 14. There is a clearance fit between the inner diameter 38 of the valve bore 14 and the outer diameter 36 of each of the first and second lands 20, 22, 28, 30 of the first and second spool valves 16, 18 that allows movement of the first and second spool valves 16, 18 within the valve bore 14. The clearance fit between the inner diameter 38 of the valve bore 14 and the outer diameter 36 of each of the first and second lands 20, 22, 28, 30 of the first and second spool valves 16, 18 is close enough to substantially stop hydraulic fluid from flowing between the inner diameter 38 of the valve bore 14 and the outer diameter 36 of each of the first and second lands 20, 22, 28, 30 of the first and second spool valves 16, 18. This is important for the operation of the hydraulic control valve 10. The first and second spool valves 16, 18 must move freely within the valve bore 14, and, at the same time, provide an almost sealed engagement to prevent hydraulic fluid from leaking past the first and second lands 20, 22, 28, 30 of the first and second spool valves 16, 18.

The central shafts 24, 32 extending between the first and second lands 20, 22, 28, 30 on each of the first and second spool valves 16, 18 has an outer diameter 40 that is smaller than the outer diameter 36 of the first and second lands 20, 22, 28, 30. There is a clearance between the outer diameter 40 of the central shafts 24, 32 of each of the first and second spool valves 16, 18 and the inner diameter 38 of the valve bore 14 that is large enough to allow hydraulic fluid to freely flow between the outer diameter 40 of the central shafts 24, 32 of each of the first and second spool valves 16, 18 and the valve bore 14. The first and second lands 20, 22 and the central shaft 24 of the first spool valve 16 and the inner diameter 38 of the valve bore 14 define a first flow chamber 42. The first and second lands 28, 30 and the central shaft 32 of the second spool valve 18 and the inner diameter 38 of the valve bore 14 define a second flow chamber 44.

The first hydraulic circuit 19 includes a first supply port 46, a first feed port 48, a first return port 50 and a first exhaust port 52. Each of the first supply port 46, first feed port 48, first return port 50 and first exhaust port 52 are formed within the valve housing 12 and are adapted to allow fluid communication with the valve bore 14. The first supply port 46 is adapted to allow hydraulic fluid to be fed into the valve bore 14 from a pressurized supply of hydraulic fluid. By way of non-limiting example, the source of pressurized hydraulic fluid may be a pump. The first feed port 48 is adapted to allow hydraulic fluid to be fed from the valve bore 14 to a first hydraulically actuated device 53. By way of non-limiting examples, the first hydraulically actuated device 53 may be a hydraulic clutch, brake, a solenoid, or an actuator adapted to move loads or position elements of agricultural or construction equipment or attachments thereto, or an actuator in automated industrial and manufacturing equipment for tool holding, work holding/clamping, and positioning cutting tools, etc. The first return port 50 is adapted to allow hydraulic fluid to return to the valve bore 14 from the first hydraulically actuated device 53. The first exhaust port 52 is adapted to exhaust hydraulic fluid from the valve bore 14.

The second hydraulic circuit 21 includes a second supply port 54, a second feed port 56, a second return port 58 and a second exhaust port 60. Each of the second supply port 54, second feed port 56, second return port 58 and second exhaust port 60 are formed within the valve housing 12 and are adapted to allow fluid communication with the valve bore 14. The second supply port 54 is adapted to allow hydraulic fluid to be fed into the valve bore 14 from a pressurized supply of hydraulic fluid. By way of non-limiting example, the source of pressurized hydraulic fluid may be a pump. The second feed port 56 is adapted to allow hydraulic fluid to be fed from the valve bore 14 to a second hydraulically actuated device 61.

By way of non-limiting example, the second hydraulically actuated device 61 may be a hydraulic, brake, a solenoid, or an actuator adapted to move loads or position elements of agricultural or construction equipment or attachments thereto, or an actuator in automated industrial and manufacturing equipment for tool holding, work holding/clamping, and positioning cutting tools, etc. The second return port 58 is adapted to allow hydraulic fluid to return to the valve bore 14 from the second hydraulically actuated device 61. The second exhaust port 60 is adapted to exhaust hydraulic fluid from the valve bore 14. In many cases, it is preferable that the first and second hydraulic circuits 19, 21 are fed by a common source. By way of non-limiting example, when the hydraulic control valve 10 is mounted within a valve body of an automatic transmission, the first and second supply ports 46, 54, the first and second feed ports 48, 56, the first and second return ports 50, 58, and the first and second exhaust ports 52, 60 align with corresponding passages within the valve body to create the first and second hydraulic circuits 19, 21 to operate clutches, brakes or solenoids within the automatic transmission.

The first spool valve 16 is slidable within the valve bore 14 between a closed position (as shown in FIG. 1) and an open position (as shown in FIG. 3). When the first spool 16 valve is in the closed position, the first feed port 48 and the first return port 50 are blocked by the first spool valve 16. The first land 20 of the first spool valve 16 is aligned with and blocks fluid flow through the first feed port 48, and the second land 22 of the first spool valve 16 is aligned with and blocks fluid flow through the first return port 50. When the first spool valve 16 is in the closed position, hydraulic fluid entering the valve bore 14 through the first supply port 46 is stopped within the first flow chamber 42.

When the first spool valve 16 is in the open position (shown in FIG. 3), the first supply port 46, the first feed port 48, the first return port 50 and the first exhaust port 52 are all open. Hydraulic fluid is able to flow into the valve bore 14 through the first supply port 46, through the first flow chamber 42 to the first feed port 48 and out of the valve bore 14 to the first hydraulically actuated device 53 through the first feed port 48. The hydraulic fluid may then return to the valve bore 14 from the first hydraulically actuated device 53 through the first return port 50 and out of the valve bore 14 through the first exhaust port 52.

The second spool valve 18 is slidable within the valve bore 14 between a closed position (as shown in FIG. 1) and an open position (as shown in FIG. 3). When the second spool valve 18 is in the closed position, the second feed port 56 and the second return port 58 are blocked by the second spool valve 18. The first land 28 of the second spool valve 18 is aligned with and blocks fluid flow through the second feed port 56, and the second land 30 of the second spool valve 18 is aligned with and blocks fluid flow through the second return port 58. When the second spool valve 18 is in the closed position, hydraulic fluid entering the valve bore 14 through the second supply port 54 is stopped within the second flow chamber 44.

When the second spool valve 18 is in the open position (shown in FIG. 3), the second supply port 54, the second feed port 56, the second return port 58 and the second exhaust port 60 are all open. Hydraulic fluid is able to flow into the valve bore 14 through the second supply port 54, through the second flow chamber 44 to the second feed port 56 and out of the valve bore 14 to the second hydraulically actuated device 61 through the second feed port 56. The hydraulic fluid may then return to the valve bore 14 from the second hydraulically actuated device 61 through the second return port 58 and out of the valve bore 14 through the second exhaust port 60.

In another exemplary embodiment, shown in FIGS. 4-8, a hydraulic control valve 110 comprises a valve housing 112, a sleeve 170 positioned within the valve housing 112 and defining a valve bore 114, a first spool valve 116 slidably positioned within the valve bore 114 and a second spool valve 118 slidably positioned within the valve bore 114. The valve bore 114 is defined by an inner diameter 172 of the sleeve 170. The first and second spool valves 116, 118 are aligned co-axially within the valve bore 114 and are independently slidable within the valve bore 114. The first spool valve 116 is adapted to control a first hydraulic circuit 119 and the second spool valve 118 is adapted to control a second hydraulic circuit 121. Movement of the first and second spool valves 116, 118 independently of one another allows the first and second hydraulic circuits 119, 121 to be controlled independently of one another.

The first spool valve 116 includes a first land 120, a second land 122, a central shaft 124 extending between the first and second lands 120, 122, and a pin shaft 126 extending longitudinally within the valve bore 114. The second spool valve 118 includes a first land 128, a second land 130, a central shaft 132 extending between the first and second lands 128, 130, and a cylindrical bore 134 formed therein. The pin shaft 126 of the first spool valve 116 extends through the cylindrical bore 134 of the second spool valve 118. There is a clearance fit between the pin shaft 132 of the first spool valve 116 and the cylindrical bore 134 of the second spool valve 118. The first and second spool valves 116, 118 are slidably moveable relative to one another within the valve bore 114.

Each of the first and second lands 120, 122, 128, 130 of the first and second spool valves 116, 118 have an outer diameter 136 and the valve bore 114 has an inner diameter 138. The outer diameter 136 of the first and second lands 120, 122, 128, 130 on the first and second spool valves 116, 118 is smaller than the inner diameter 138 of the valve bore 114. There is a clearance fit between the inner diameter 138 of the valve bore 114 and the outer diameter 136 of each of the first and second lands 120, 122, 128, 130 of the first and second spool valves 116, 118 that allows movement of the first and second spool valves 116, 118 within the valve bore 114. The clearance fit between the inner diameter 138 of the valve bore 114 and the outer diameter 136 of each of the first and second lands 120, 122, 128, 130 of the first and second spool valves 116, 118 is close enough to substantially stop hydraulic fluid from flowing between the inner diameter 138 of the valve bore 114 and the outer diameter 136 of each of the first and second lands 120, 122, 128, 130 of the first and second spool valves 116, 118. This is important for the operation of the hydraulic control valve 110. The first and second spool valves 116, 118 must move freely within the valve bore 114, and, at the same time, provide an almost sealed engagement to prevent hydraulic fluid from leaking past the first and second lands 120, 122, 128, 130 of the first and second spool valves 116, 118.

The central shafts 124, 132 extending between the first and second lands 120, 122, 128, 130 on each of the first and second spool valves 116, 118 has an outer diameter 140 that is smaller than the outer diameter 136 of the first and second lands 120, 122, 128, 130. There is a clearance between the outer diameter 140 of the central shafts 124, 132 of each of the first and second spool valves 116, 118 and the valve bore 114 that is large enough to allow hydraulic fluid to freely flow between the outer diameter 140 of the central shafts 124, 132 of each of the first and second spool valves 116, 118 and the valve bore 114. The first and second lands 120, 122 and the central shaft 124 of the first spool valve 116 and the inner diameter 138 of the valve bore 114 define a first flow chamber 142. The first and second lands 128, 130 and the central shaft 132 of the second spool valve 118 and the inner diameter 138 of the valve bore 114 define a second flow chamber 144.

The first hydraulic circuit 119 includes a first supply port 146, a first feed port 148, a first return port 150 and a first exhaust port 152. Each of the first supply port 146, first feed port 148, first return port 150 and first exhaust port 152 are comprised of aligned openings within the valve housing 112 and the sleeve 170 and are adapted to allow fluid communication with the valve bore 114. The first supply port 146 is adapted to allow hydraulic fluid to be fed into the valve bore 114 from a pressurized supply of hydraulic fluid. By way of non-limiting example, the source of pressurized hydraulic fluid may be a pump. The first feed port 148 is adapted to allow hydraulic fluid to be fed from the valve bore 114 to a first hydraulically actuated device 153. By way of non-limiting example, the first hydraulically actuated device 153 may be a hydraulic clutch or brake or a solenoid. The first return port 150 is adapted to allow hydraulic fluid to return to the valve bore 114 from the first hydraulically actuated device 153. The first exhaust port 152 is adapted to exhaust hydraulic fluid from the valve bore 114.

The second hydraulic circuit 121 includes a second supply port 154, a second feed port 156, a second return port 158 and a second exhaust port 160. Each of the second supply port 154, second feed port 156, second return port 158 and second exhaust port 160 are comprised of aligned openings within the valve housing 112 and the sleeve 170 and are adapted to allow fluid communication with the valve bore 114. The second supply port 154 is adapted to allow hydraulic fluid to be fed into the valve bore 114 from a pressurized supply of hydraulic fluid. By way of non-limiting example, the source of pressurized hydraulic fluid may be a pump. The second feed port 156 is adapted to allow hydraulic fluid to be fed from the valve bore 114 to a second hydraulically actuated device 161. By way of non-limiting example, the second hydraulically actuated device 161 may be a hydraulic clutch or brake or a solenoid. The second return port 158 is adapted to allow hydraulic fluid to return to the valve bore 114 from the second hydraulically actuated device 161. The second exhaust port 160 is adapted to exhaust hydraulic fluid from the valve bore 114.

The sleeve 170 includes a supply channel 174 and an exhaust channel 176 formed therein. The supply channel 174 interconnects the first and second supply ports 146, 154. The exhaust channel 176 interconnects the first and second exhaust ports 152, 160. The supply channel 174 formed within the sleeve 170 allows both the first and second supply ports 146, 154 to be supplied from a common source of hydraulic fluid. More importantly, the supply channel 174 formed within the sleeve 170 allows the hydraulic fluid to be supplied to the first and second supply ports 146, 154 through a supply opening 178 at an axial end of the valve housing 112. In the same way, the exhaust channel 176 formed within the sleeve 170 allows the hydraulic fluid to be exhausted through an exhaust opening 180 at an axial end of the valve housing 112.

Figure 7:
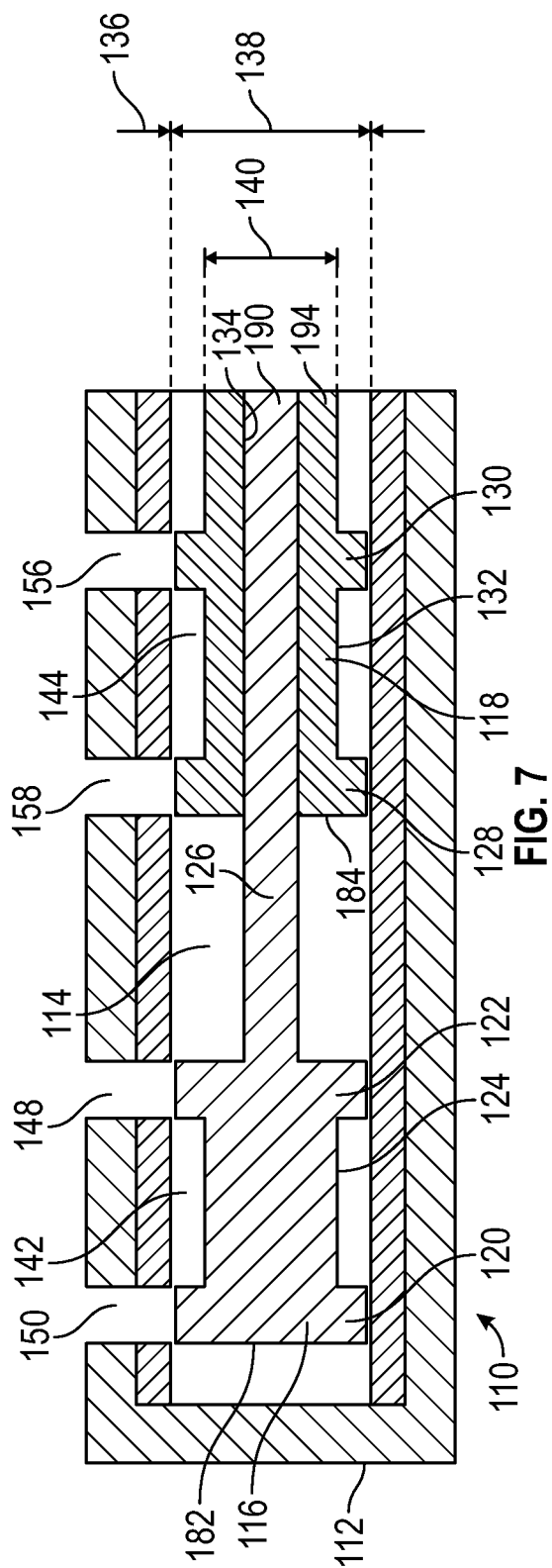
FIG. 7 is a schematic sectional view of the hydraulic control valve shown in FIG. 4, illustrating the supply port, the feed port, the return port and the exhaust port with the first and second spool valves in the closed position.
Figure 8:
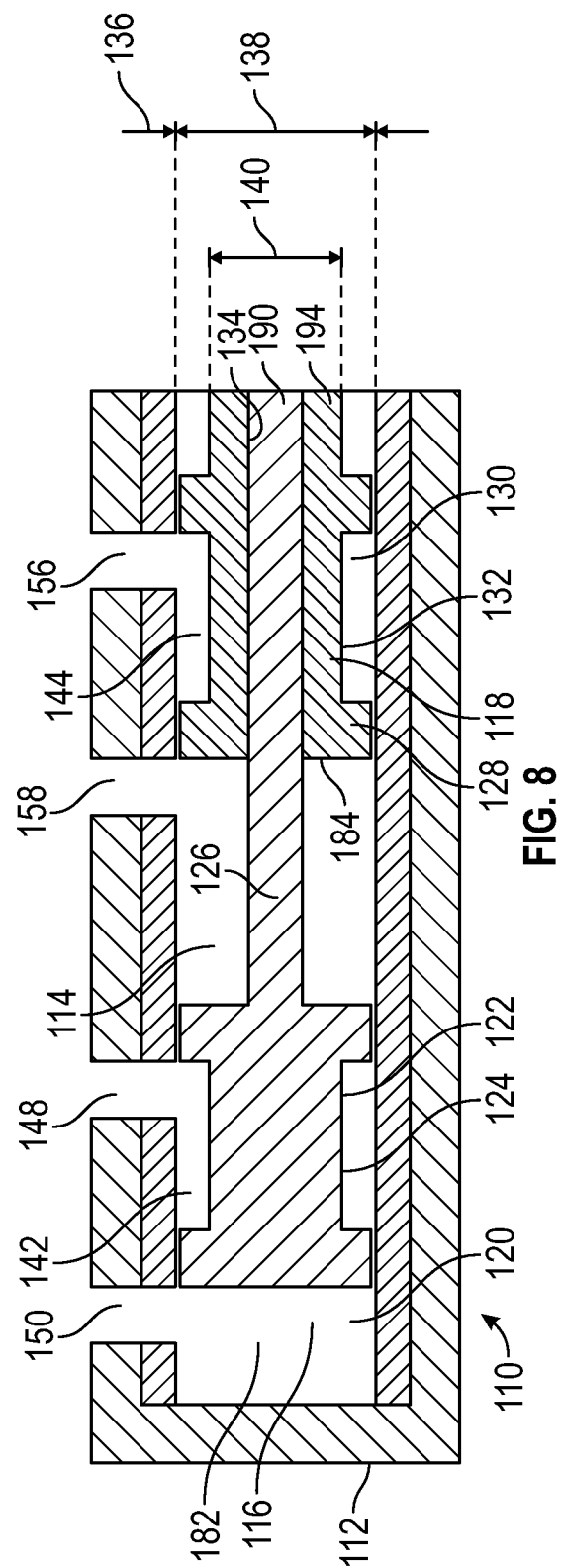
FIG. 8 is a schematic sectional view of the hydraulic control valve shown in FIG. 4, illustrating the supply port, the feed port, the return port and the exhaust port with the first and second spool valves in the open position.

The first spool valve 116 is slidable within the valve bore 114 between a closed position (as shown in FIG. 7) and an open position (as shown FIG. 8). When the first spool valve 116 is in the closed position, the first feed port 148 and the first return port 150 are blocked by the first spool valve 116. The first land 120 of the first spool valve 116 is aligned with and blocks fluid flow through the first feed port 148, and the second land 122 of the first spool valve 116 is aligned with and blocks fluid flow through the first return port 150. When the first spool valve 116 is in the closed position, hydraulic fluid entering the valve bore 114 through the first supply port 146 is stopped within the first flow chamber 142.

When the first spool valve 116 is in the open position (shown in FIG. 8), the first supply port 146, the first feed port 148, the first return port 150 and the first exhaust port 152 are all open. Hydraulic fluid is able to flow into the valve bore 114 through the first supply port 146, through the first flow chamber 142 to the first feed port 148 and on to the first hydraulically actuated device 153 through the first feed port 148. The hydraulic fluid may then return to the valve bore 114 from the first hydraulically actuated device 153 through the first return port 150 and out of the valve bore 114 through the first exhaust port 152 and into the exhaust channel 176.

The second spool valve 118 is slidable within the valve bore 114 between a closed position (as shown in FIG. 7) and an open position (as shown in FIG. 8). When the second spool valve 118 is in the closed position, the second feed port 156 and the second return port 158 are blocked by the second spool valve 118. The first land 128 of the second spool valve 118 is aligned with and blocks fluid flow through the second feed port 156, and the second land 130 of the second spool valve 118 is aligned with and blocks fluid flow through the second return port 158. When the second spool valve 118 is in the closed position, hydraulic fluid entering the valve bore 114 through the second supply port 154 is stopped within the second flow chamber 144.

When the second spool valve 118 is in the open position (shown in FIG. 8), the second supply port 154, the second feed port 156, the second return port 158 and the second exhaust port 160 are all open. Hydraulic fluid is able to flow into the valve bore 114 through the second supply port 154, through the second flow chamber 144 to the second feed port 156 and on to the second hydraulically actuated device 161 through the second feed port 156. The hydraulic fluid may then return to the valve bore 114 from the second hydraulically actuated device 161 through the second return port 158 and out of the valve bore 114 through the second exhaust port 160.

Each of the first and second spool valves 116, 118 are biased to the open position. A pair of springs are positioned within the valve bore. A first spring is axially aligned with and pushes against a first end 182 of the first spool valve 116 to push the first spool valve 116 toward the open position and maintain the first spool valve 116 in the open position. A second spring is axially aligned with and pushes against a first end 184 of the second spool valve 118 to push the second spool valve 118 toward the open position and maintain the second spool valve 118 in the open position.

An actuator 186 is mounted at an end of the valve housing 112. The actuator 186 is adapted to selectively and independently push either of the first or second spool valves 116, 118 toward the closed position. The actuator 186 includes a first engagement member 188 that is in contact with a second end 190 of the first spool valve 116. The first engagement member 188 selectively pushes against the second end 190 of the first spool valve 116 to overcome the force of the first spring and move the first spool valve 116 from the open position to the closed position. The actuator 186 further includes a second engagement member 192 that is in contact with a second end 194 of the second spool valve 118. The second engagement member 192 selectively pushes against the second end 194 of the second spool valve 118 to overcome the force of the second spring and move the second spool valve 118 from the open position to the closed position.

In operation, the hydraulic control valve 10, 110 will experience varying temperatures as the hydraulic valve 10, 110 is exposed to hydraulic fluid that is heated by frictional forces within the automatic transmission. Because these temperatures will vary greatly, it is important that the valve housing 12, 112 and the first and second spool valves 16, 18, 116, 118 are made from a common material. Making the valve housing 12, 112 and the first and second spool valves 16, 18, 116, 118 from a common material ensures that the valve housing 12, 112 and the first and second spool valves 16, 18, 116, 118 have the same thermal expansion properties. This is important to ensure that the spool valves 16, 18, 116, 118 remain moveable within the valve bore 14, 114 while maintaining a fluid seal between the first and second lands 20, 22, 28, 30, 120, 122, 128, 130 of the first and second spool valves 16, 18, 116, 118 and the inner diameter 38, 138 of the valve bore 14, 114. Further, for the same reasons, the sleeve 170 of the hydraulic control valve 110 must be made from the same material as the valve housing 112 and first and second spool valves 116, 118.

The hydraulic control valve 10, 110 of the present disclosure offers a significant advantage over prior hydraulic valves by providing control of two independent hydraulic circuits 19, 21 or 119, 121 in a compact package. Further, the first and second spool valves 16, 18, 116, 118 of the hydraulic control valve 10, 110 of the present disclosure allows each of the two hydraulic circuits 19, 21, 119, 121 to be controlled with a single actuator 186 that is mounted at an end of the valve housing 12, 112 and axially aligned with the valve housing 12, 112.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hydraulic control valve for controlling hydraulic circuits, comprising:
   a valve housing defining a valve bore;
   a first spool valve including a first land, a second land, a central shaft extending between the first and second lands and a pin shaft extending longitudinally within the valve bore, the first spool valve slidably positioned within the valve bore and adapted to control a first hydraulic circuit; and
   a second spool valve including a first land, a second land, a central shaft extending between the first and second lands, and a cylindrical bore formed therein, the second spool valve slidably positioned within the valve bore and adapted to control a second hydraulic circuit, the pin shaft of the first spool valve extending through the cylindrical bore of the second spool valve;
   wherein the first spool valve and the second spool valve are positioned co-axially within the valve bore and are independently slidable within the valve bore to allow the first and second spool valves to control the first and second hydraulic valves independently of one another.

2. The hydraulic control valve of claim 1, wherein each of the first and second lands of the first and second spool valves have an outer diameter and the valve bore has an inner diameter, wherein there is a clearance fit between the inner diameter of the valve bore and the outer diameter of each of the first and second lands of the first and second spool valves, allowing movement of the first and second spool valves within the valve bore and substantially stopping hydraulic fluid from flowing between the inner diameter of the valve bore and the outer diameter of each of the first and second lands of the first and second spool valves.

3. The hydraulic control valve of claim 2, wherein the central shafts extending between the first and second lands on each of the first and second spool valves has an outer diameter, wherein a first flow chamber is defined by the first and second lands and the central shaft of the first spool valve and the inner diameter of the valve bore, and a second flow chamber is defined by the first and second lands and the central shaft of the second spool valve and the inner diameter of the valve bore.

4. The hydraulic control valve of claim 3, wherein the first hydraulic circuit includes a first supply port, a first feed port, a first return port and a first exhaust port, the first supply port adapted to allow hydraulic fluid to be fed into the valve bore, the first feed port adapted to allow hydraulic fluid to be fed from the valve bore to a first hydraulically actuated device, the first return port adapted to allow hydraulic fluid to return to the valve bore from the first hydraulically actuated device, and the first exhaust port adapted to exhaust hydraulic fluid from the valve bore, and the second hydraulic circuit includes a second supply port, a second feed port, a second return port and a second exhaust port, the second supply port adapted to allow hydraulic fluid to be fed into the valve bore, the second feed port adapted to allow hydraulic fluid to be fed from the valve bore to a second hydraulically actuated device, the second return port adapted to allow hydraulic fluid to return to the valve bore from the second hydraulically actuated device, and the second exhaust port adapted to exhaust hydraulic fluid from the valve bore.

5. The hydraulic control valve of claim 4 wherein the first supply port and the second supply port are connected to a common pressurized hydraulic fluid source.

6. The hydraulic control valve of claim 4, wherein the first spool valve is slidable within the valve bore between a closed position and an open position, wherein when the first spool valve is in the closed position, the first feed port and the first return port are blocked by the first spool valve and when the first spool valve is in the open position, the first supply port, the first feed port, the first return port and the first exhaust port are all open and hydraulic fluid is able to flow into the valve bore through the first supply port, to the first hydraulically actuated device through the first feed port, back to the valve bore from the first hydraulically actuated device through the first return port and out of the valve bore through the first exhaust port.

7. The hydraulic control valve of claim 6, wherein the second spool valve is slidable within the valve bore between a closed position and an open position, wherein when the second spool valve is in the closed position, the second feed port and the second return port are blocked by the second spool valve and when the second spool valve is in the open position, the second supply port, the second feed port, the second return port and the second exhaust port are all open and hydraulic fluid is able to flow into the valve bore through the second supply port, to the second hydraulically actuated device through the second feed port, back to the valve bore from the second hydraulically actuated device through the second return port and out of the valve bore through the second exhaust port.

8. The hydraulic control valve of claim 7, wherein when the first spool valve is in the closed position, the first land of the first spool valve is aligned with and blocks the first feed port and the second land of the first spool valve is aligned with and blocks the first return port, and hydraulic fluid entering the valve bore through the first supply port is stopped within the first flow chamber, and when the second spool valve is in the closed position, the first land of the second spool valve is aligned with and blocks the second feed port and the second land of the second spool valve is aligned with and blocks the second return port, and hydraulic fluid entering the valve bore through the second supply port is stopped within the second flow chamber.

9. The hydraulic control valve of claim 1, further comprising an actuator mounted near an end of the valve housing, wherein the actuator is adapted to selectively and independently move the first and second spool valves within the valve bore.

10. The hydraulic control valve of claim 1, wherein the valve housing and the first and second spool valves are made from a common material.

11. A hydraulic control valve for controlling hydraulic circuits, comprising:
   a valve housing defining a valve bore;
   a first spool valve slidably positioned within the valve bore and adapted to control a first hydraulic circuit;
   a second spool valve slidably positioned within the valve bore and adapted to control a second hydraulic circuit, wherein the first spool valve and the second spool valve are positioned co-axially within the valve bore and are independently slidable within the valve bore to allow the first and second spool valves to control the first and second hydraulic valves independently of one another; and
   a sleeve positioned within the valve housing, an inner diameter of the sleeve defining the valve bore, the sleeve including a supply channel formed therein interconnecting first and second supply ports, and an exhaust channel formed therein interconnecting first and second exhaust ports.

12. The hydraulic control valve of claim 11, wherein the first spool valve includes a first land, a second land, a central shaft extending between the first and second lands, and a pin shaft extending longitudinally within the valve bore, and the second spool valve includes a first land, a second land, a central shaft extending between the first and second lands, and a cylindrical bore formed therein, further wherein, the pin shaft of the first spool valve extends through the cylindrical bore of the second spool valve.

13. The hydraulic control valve of claim 12, wherein each of the first and second lands of the first and second spool valves have an outer diameter and the valve bore has an inner diameter, wherein there is a clearance fit between the inner diameter of the valve bore and the outer diameter of each of the first and second lands of the first and second spool valves, allowing movement of the first and second spool valves within the valve bore and substantially stopping hydraulic fluid from flowing between the inner diameter of the valve bore and the outer diameter of each of the first and second lands of the first and second spool valves.

14. The hydraulic control valve of claim 13, wherein the central shafts extending between the first and second lands on each of the first and second spool valves has an outer diameter, wherein a first flow chamber is defined by the first and second lands and the central shaft of the first spool valve and the inner diameter of the valve bore, and a second flow chamber is defined by the first and second lands and the central shaft of the second spool valve and the inner diameter of the valve bore.

15. The hydraulic control valve of claim 14, wherein the first hydraulic circuit includes the first supply port, a first feed port, a first return port and the first exhaust port, the first supply port adapted to allow hydraulic fluid to be fed through the valve housing and the sleeve into the valve bore, the first feed port adapted to allow hydraulic fluid to be fed from the valve bore through the sleeve and the valve housing to a first hydraulically actuated device, the first return port adapted to allow hydraulic fluid to return to the valve bore through the valve housing and the sleeve from the first hydraulically actuated device, and the first exhaust port adapted to exhaust hydraulic fluid from the valve bore to the exhaust channel formed within the sleeve, and the second hydraulic circuit includes the second supply port, a second feed port, a second return port and the second exhaust port, the second supply port adapted to allow hydraulic fluid to be fed through the valve housing and the sleeve into the valve bore, the second feed port adapted to allow hydraulic fluid to be fed from the valve bore through the sleeve and the valve housing to a second hydraulically actuated device, the second return port adapted to allow hydraulic fluid to return to the valve bore through the valve housing and the sleeve from the second hydraulically actuated device, and the second exhaust port adapted to exhaust hydraulic fluid from the valve bore to the exhaust channel formed within the sleeve.

16. The hydraulic control valve of claim 15, wherein the first spool valve is slidable within the valve bore between a closed position and an open position, wherein when the first spool valve is in the closed position, the first feed port and the first return port are blocked by the first spool valve and when the first spool valve is in the open position, the first supply port, the first feed port, the first return port and the first exhaust port are all open and hydraulic fluid is able to flow into the valve bore through the first supply port, to the first hydraulically actuated device through the first feed port, back to the valve bore from the first hydraulically actuated device through the first return port and out of the valve bore through the first exhaust port.

17. The hydraulic control valve of claim 16, wherein the second spool valve is slidable within the valve bore between a closed position and an open position, wherein when the second spool valve is in the closed position, the second feed port and the second return port are blocked by the second spool valve and when the second spool valve is in the open position, the second supply port, the second feed port, the second return port and the second exhaust port are all open and hydraulic fluid is able to flow into the valve bore through the second supply port, to the second hydraulically actuated device through the second feed port, back to the valve bore from the second hydraulically actuated device through the second return port and out of the valve bore through the second exhaust port.

18. The hydraulic control valve of claim 16, wherein when the first spool valve is in the closed position, the first land of the first spool valve is aligned with and blocks the first feed port formed in the valve housing and the sleeve and the second land of the first spool valve is aligned with and blocks the first return port formed in the valve housing and the sleeve, and hydraulic fluid entering the valve bore through the first supply port is stopped within the first flow chamber, and when the second spool valve is in the closed position, the first land of the second spool valve is aligned with and blocks the second feed port and the second land of the second spool valve is aligned with and blocks the second return port, and hydraulic fluid entering the valve bore through the second supply port is stopped within the second flow chamber.

19. The hydraulic control valve of claim 11, wherein the valve housing, the first and second spool valves and the sleeve are made from a common material.

* * * * *